(12) United States Patent
Rodriguez

(10) Patent No.: US 9,731,570 B1
(45) Date of Patent: Aug. 15, 2017

(54) VEHICLE HITCH COVER

(71) Applicant: Carlos Enrique Rodriguez, Hialeah, FL (US)

(72) Inventor: Carlos Enrique Rodriguez, Hialeah, FL (US)

( * ) Notice: Subject to any disclaimer, the term of this patent is extended or adjusted under 35 U.S.C. 154(b) by 0 days.

(21) Appl. No.: 15/059,506

(22) Filed: Mar. 3, 2016

Related U.S. Application Data

(60) Provisional application No. 62/129,211, filed on Mar. 6, 2015.

(51) Int. Cl.
*B60D 1/60* (2006.01)
*B60D 1/06* (2006.01)

(52) U.S. Cl.
CPC .............. *B60D 1/605* (2013.01); *B60D 1/06* (2013.01)

(58) Field of Classification Search
CPC .................................. B60D 1/60; B60D 1/605
See application file for complete search history.

(56) References Cited

U.S. PATENT DOCUMENTS

| | | | | |
|---|---|---|---|---|
| 3,596,926 A | * | 8/1971 | Randall | B60D 1/605 280/507 |
| 3,605,457 A | * | 9/1971 | Foster | B60D 1/60 280/507 |
| 4,738,293 A | | 4/1988 | Ostrom et al. | |
| 5,037,122 A | | 8/1991 | Beckerer, Jr. | |
| 5,421,601 A | * | 6/1995 | Hinze | B60D 1/60 280/507 |
| 5,775,139 A | * | 7/1998 | Sellers | B60D 1/60 280/507 |
| 5,947,506 A | * | 9/1999 | Bauer | B60D 1/60 280/507 |
| 6,086,438 A | * | 7/2000 | Wang | B60D 1/60 440/49 |
| 6,102,424 A | | 8/2000 | Cole, Jr. et al. | |
| 6,322,094 B1 | | 11/2001 | Poe | |
| 6,412,313 B1 | * | 7/2002 | Bernstrom | B60D 1/60 280/507 |
| 6,439,595 B1 | * | 8/2002 | Cheng | B60D 1/06 280/507 |
| 6,874,805 B2 | * | 4/2005 | Bagley | B60D 1/60 280/507 |
| D599,362 S | | 9/2009 | Danton | |
| 8,550,487 B2 | * | 10/2013 | Fox | B60D 1/60 280/507 |
| 2003/0189313 A1 | * | 10/2003 | Sievers | B60D 1/06 280/507 |
| 2011/0048083 A1 | * | 3/2011 | Adolph | B60D 1/60 70/58 |

* cited by examiner

*Primary Examiner* — Kevin Hurley
(74) *Attorney, Agent, or Firm* — H. John Rizvi; Gold & Rizvi, P.A.

(57) ABSTRACT

A vehicle hitch cover for covering a hitch ball of a vehicle hitch is disclosed, the hitch cover including a ball cover portion for concealing the hitch ball and a secondary cover portion providing a mount for the ball cover portion. The ball cover portion includes at least one movable cover that is movable relative to the hitch ball of the vehicle hitch. The at least one movable cover is movable between a closed position for fully covering and concealing the hitch ball and an opened position for exposing the hitch ball. The secondary cover portion is in turn removably attached to the vehicle hitch.

19 Claims, 6 Drawing Sheets

VEHICLE HITCH COVER

CROSS-REFERENCE TO RELATED APPLICATION

This application claims the benefit of U.S. Provisional Patent Application Ser. No. 62/129,211, filed Mar. 6, 2015, which is incorporated herein in its entirety.

FIELD OF THE INVENTION

The present invention relates generally to vehicle accessories, and more particularly, to a vehicle hitch cover that completely conceals a hitch ball to prevent the hitch ball from attracting dirt and getting rusty while the hitch ball is not in use and that provides access to the hitch ball when the hitch ball is to be used such as for hitching a trailer.

BACKGROUND OF THE INVENTION

A trailer hitch (also known as a tow hitch) is a metal part that can be attached to the back undercarriage of a vehicle, typically a large vehicle such as a pickup truck or a sport utility vehicle (SUV), for the purpose of attaching a trailer to the vehicle. The most common trailer hitches, i.e. the type used by most cars, pickups, and sport utility vehicles, are known as Class 1 through Class 5 hitches, capable of carrying loads up to 10,000 pounds. Typically, Class 1 and 2 hitches are for cars, smaller SUVs, and small trucks, while Class 3, 4, and 5 hitches are used on larger minivans, pickups, SUVs, and almost all RVs. These hitches include a hitch ball (also known as a tow ball), typically two inches in diameter, upon which a trailer's ball coupler can be attached. The trailer is then ready for towing.

Since the hitch ball sustains heavy weight and friction from the ball coupler on top of it, the hitch ball should be regularly lubricated so that its life can be extended. However, the lubricant is known to attract dirt and other debris which can interfere with the fit of the ball coupler. In order to minimize the debris sticking to the hitch ball, a hitch ball cover can be employed while the hitch ball is not in use. The hitch ball cover can also keep the lubricant on the hitch ball in order to protect the hitch ball from becoming rusty. The hitch ball cover further has the function of preventing the lubricant or grease on the hitch ball from contaminating a user's cloth through unintentional contact. Additionally, the hitch ball cover can be decoratively shaped to provide an aesthetic appearance or a personal statement.

Hitch ball covers can range from do-it-yourself items such as the commonly seen half of a tennis ball to more sophisticated hitch ball covers that are custom-made, including novelty items that cover the hitch ball such as a cover with a U.S. National Football League (NFL) team logo. However, most of these covers do not cover the hitch ball completely enough to offer full protection. In addition, many hitch ball covers are in risk of falling off when the vehicle is moving.

Accordingly, there remains a need in the art for a vehicle hitch cover which solves at least one of the problems described heretofore. For instance, there is an established need for a vehicle hitch cover that can completely conceal a hitch ball to prevent the hitch ball from attracting dirt and getting rusty while the hitch ball is not in use. There is also a need for a vehicle hitch cover that minimizes the risk of the hitch cover falling off from the hitch ball when the vehicle is moving.

SUMMARY OF THE INVENTION

The present invention is directed to a convenient, time saving, and labor saving vehicle hitch cover that is capable of completely concealing a hitch ball so as to prevent the hitch ball from attracting dirt and getting rusty while the hitch ball is not in use. In addition, in preferred embodiments of the invention, the vehicle hitch cover is capable of providing access to the hitch ball so as to attach a trailer to the hitch ball, without having to remove the hitch cover. In consequence, the hitch cover needs not be taken off when a trailer is attached, thereby reducing the risk of loss or misplacement of the hitch ball cover and reducing the time needed to attach the trailer to a vehicle hitch that is fitted with a vehicle cover, as well as reducing the time needed to place the hitch cover back onto the vehicle hitch when the hitch ball is not in use.

In a first implementation of the invention, a vehicle hitch includes a hitch mount for attaching to a vehicle, and a hitch ball assembly affixed to the hitch mount. The hitch ball assembly includes a hitch ball extending outwardly from the hitch mount. A vehicle hitch cover, in turn, includes a ball cover portion and a secondary cover portion to which the ball portion can be secured. The ball cover portion includes at least one movable cover that is movable relative to the hitch ball of the vehicle hitch. The at least one movable cover is movable between a closed position for fully covering and concealing the hitch ball and an opened position for exposing the hitch ball. The secondary cover portion is removably attached to the vehicle hitch.

In a second aspect, the at least one movable cover can be removably attached to the secondary cover portion. Alternatively, the at least one movable cover can be pivotably movable relative to the hitch ball. For instance, the at least one movable cover can consist of a single movable cover, which is pivotable about a transverse or longitudinal pivoting axis arranged perpendicular or parallel, respectively, to a shank of the hitch mount. In another example, the at least one movable cover can consist of two opposite side movable covers, which are pivotable about respective transverse or longitudinal pivoting axes arranged perpendicular or parallel, respectively, to a shank of the hitch mount.

In another aspect, the ball cover portion can include a fixed mounting plate removably attachable to the secondary cover portion. The at least one movable cover can be pivotably connected to the mounting plate.

In another aspect, the hitch cover can further include at least one fastener for securing the at least one movable cover in the closed position. For instance, each movable cover can include a locking tab configured to be received in a corresponding locking tab receptacle formed the mounting plate to secure the at least one movable cover in the closed position. Alternatively, the locking tab(s) may be provided on the mounting plate and the locking tab receptacle(s) may be provided on the at least one movable cover.

In yet another aspect, the secondary cover portion can be made of at least two separate parts removably attachable to one another.

In another aspect, the hitch ball assembly can further include a hitch ball assembly end portion extending outwardly from the hitch mount oppositely to the hitch ball. In turn, the secondary cover portion of the hitch cover can be configured to cover the hitch ball assembly end portion when the secondary cover portion is attached to the vehicle hitch.

In another aspect, the hitch mount can include a shank and a bracket extending from the shank, the bracket comprising a flange on which the hitch ball assembly is mounted. The secondary cover portion can include a rim at least partially embracing the flange. The ball cover portion can be secured to an end surface of the rim. For instance, the fixed mounting plate can be removably attached to the rim.

In another aspect, the secondary cover portion can include a seating surface for the seating thereon of a surface of the flange opposed to the hitch ball. The rim can extend from the seating surface. Furthermore, the secondary cover portion can include a cavity for receiving the hitch ball assembly end portion. The cavity extends from the seating surface.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a convenient, time saving, and labor saving vehicle hitch cover that is capable of completely concealing a hitch ball so as to prevent the hitch ball from attracting dirt and getting rusty while the hitch ball is not in use, and that is also capable of providing access to the hitch ball for use without the hitch cover having to be taken off.

Figure 4:
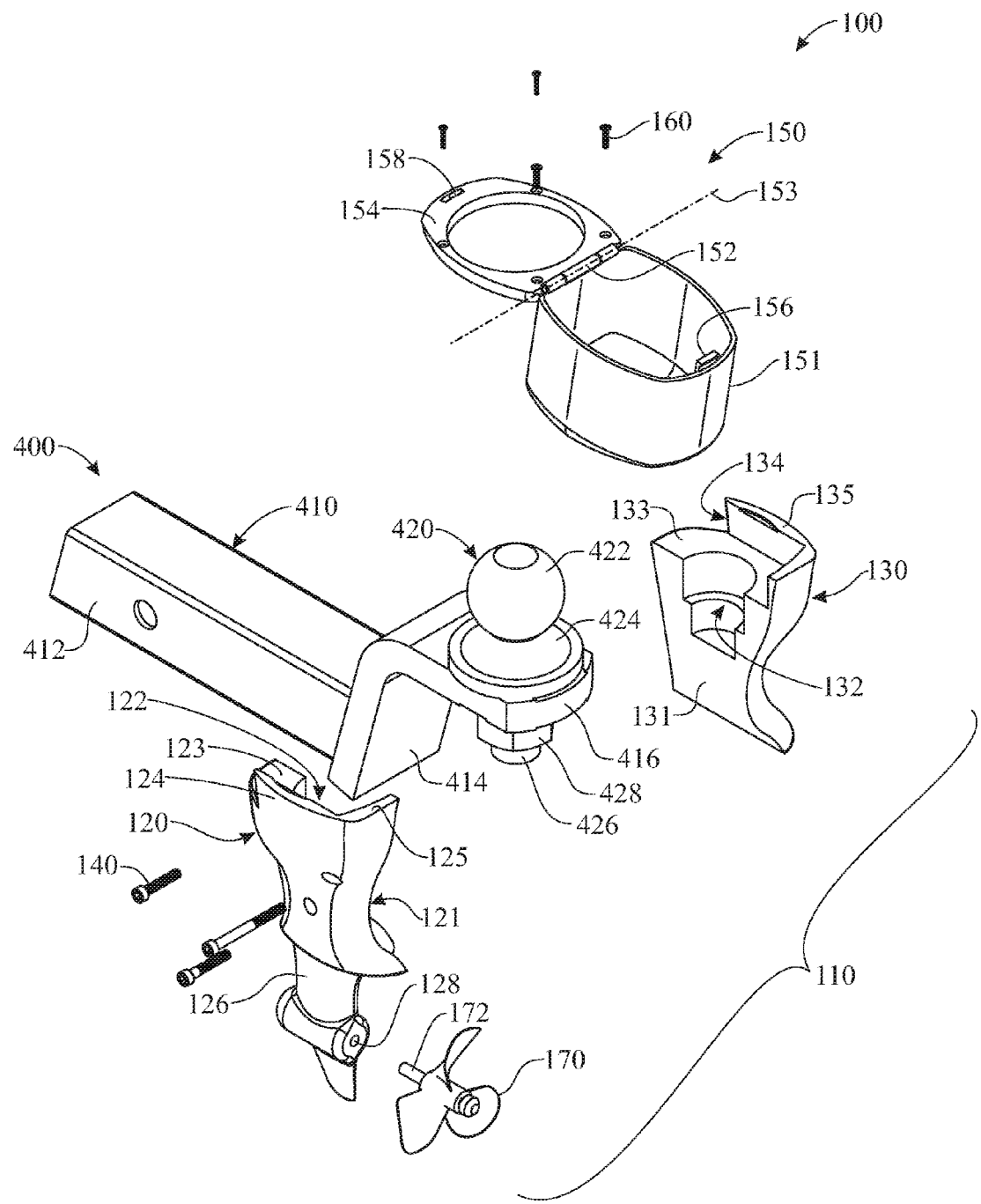
FIG. 4 presents an isometric exploded view of the assembly of FIG. 1.
Figure 5:
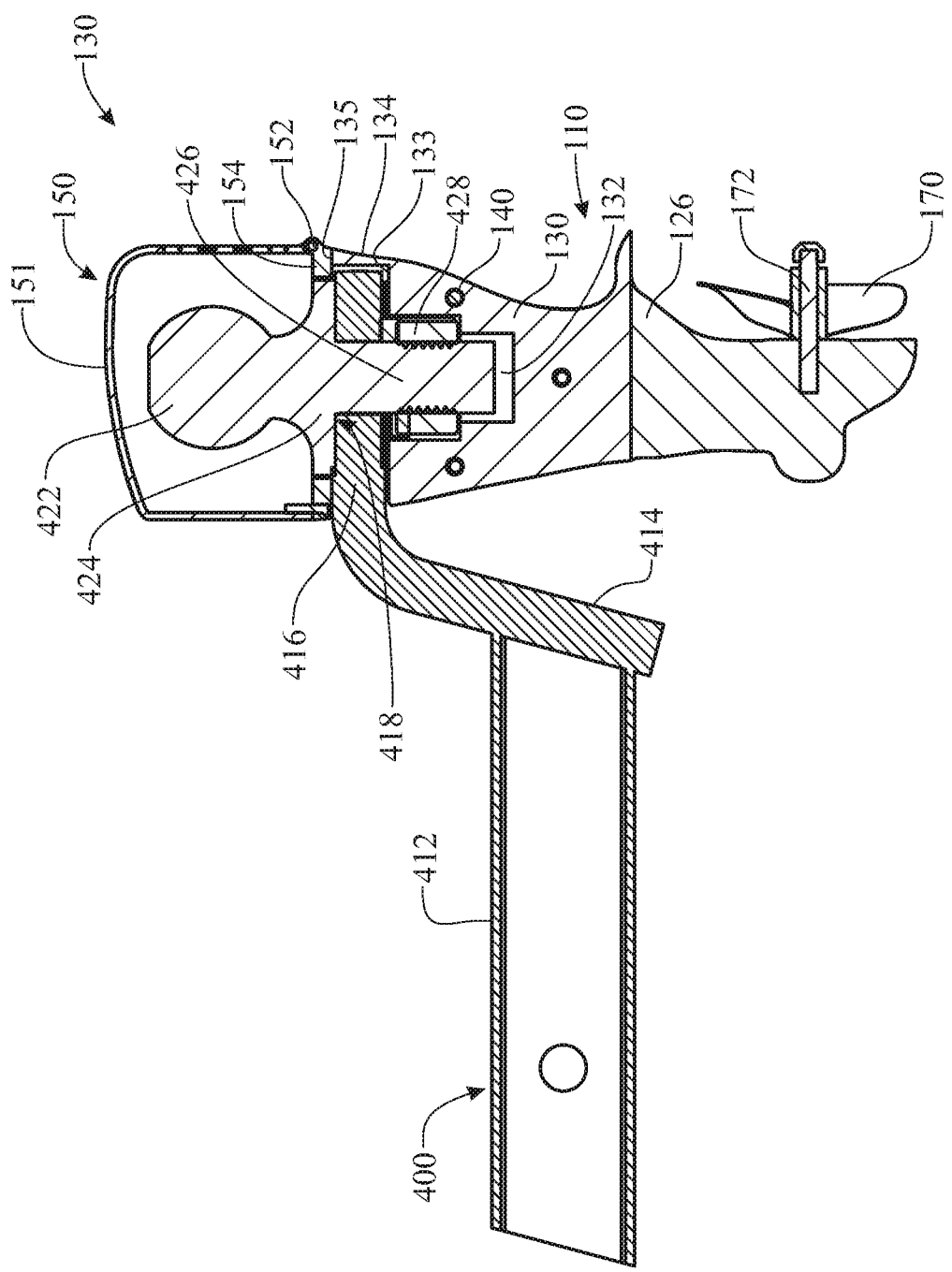
FIG. 5 presents a cross-sectional side elevation view of the assembly of FIG. 1.

Referring initially to FIGS. 1 through 5, a vehicle hitch cover 100 is illustrated in accordance with a first exemplary embodiment of the present invention. The vehicle hitch cover 100 is shown in the figures in different positions and configurations with respect to an exemplary conventional vehicle hitch 400. The vehicle hitch 400 shown in the drawings comprises a hitch mount 410 to which a hitch ball assembly 420 is attached. The hitch mount 410 includes a shank 412, a bracket 414 and a rearwardly protruding ball-supporting flange 416 including a through hole 418 (FIG. 5). In turn, the hitch ball assembly 420 comprises an integrally-formed hitch ball 422, ball base 424 and threaded rod 426, and a nut 428 configured to thread onto the threaded rod 426. As best shown in FIG. 5 and known in the art, the hitch ball assembly 420 is installed on the hitch mount 410 by inserting the threaded rod 426 through the through hole 418 of the flange 416, and tightening the nut 428 to stably and securely support the ball base 424 on the flange 416. In this assembled position, the ball base 424 and the hitch ball 422 protrude outwardly and upwardly from the flange 416. In turn, the nut 428 and a portion of the threaded rod 426 form a hitch ball assembly end portion that protrudes outwardly and downwardly from the flange 416.

Figure 1:
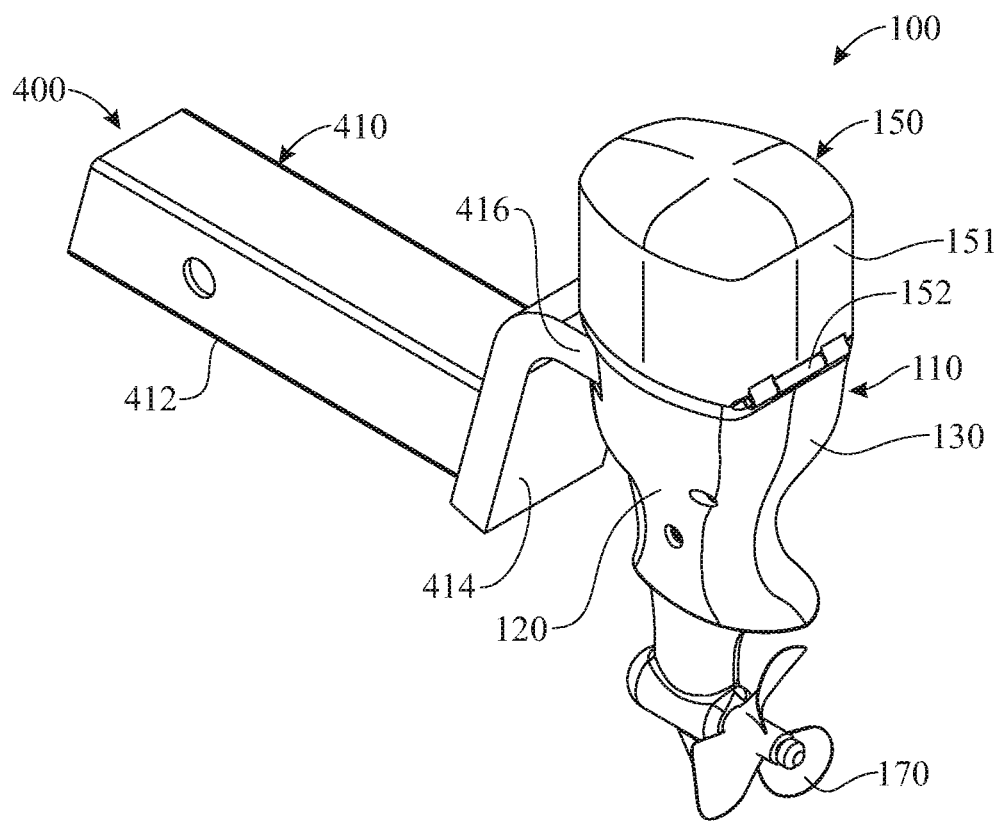
FIG. 1 presents an isometric rear view of an exemplary vehicle hitch provided with a first exemplary embodiment of a vehicle hitch cover, shown in a closed position.
Figure 2:
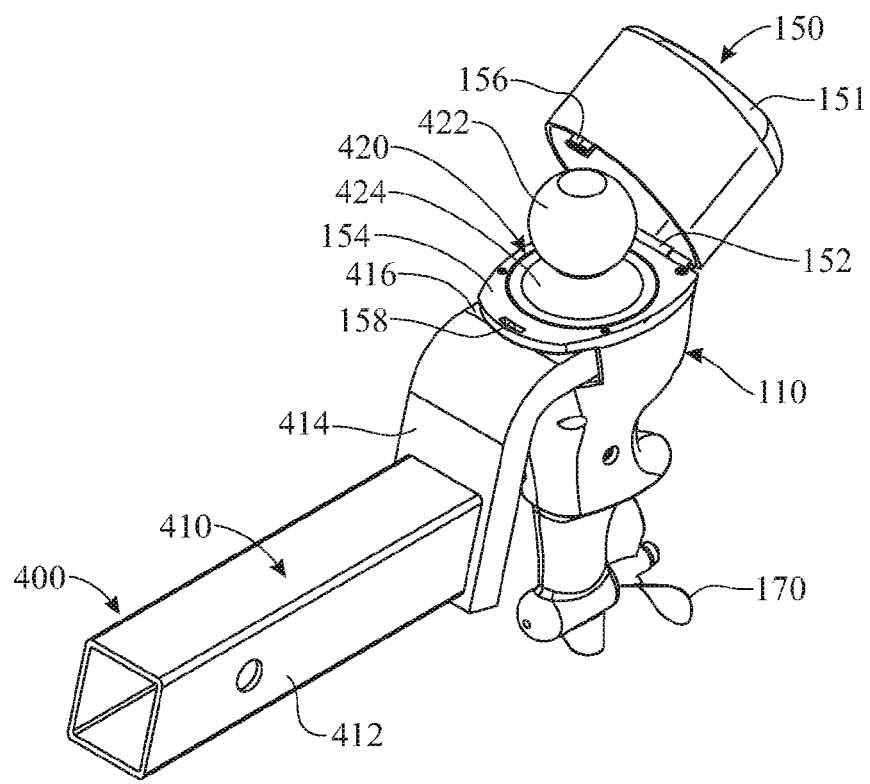
FIG. 2 presents an isometric front view of the assembly of FIG. 1, the vehicle hitch cover being shown in a partially opened position.
Figure 3:
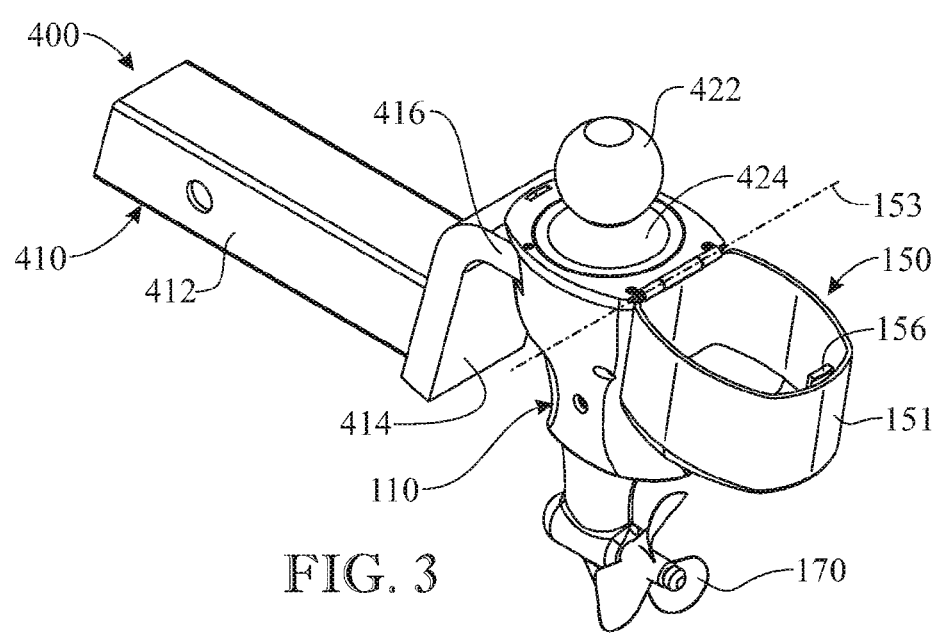
FIG. 3 presents an isometric rear view of the assembly of FIG. 1, the vehicle hitch cover being shown in a fully opened position.

As shown in FIG. 1, the vehicle hitch cover 100 of the present embodiment includes an upper, ball cover portion 150 and a lower, secondary cover portion 110. As best shown in FIGS. 4 and 5, the secondary cover portion 110 covers the downwardly protruding parts of the hitch ball assembly 420, i.e. the hitch ball assembly end portion formed by the nut 428 and the downwardly protruding portion of the threaded rod 426; in addition, the secondary cover portion 110 of the present embodiment covers part of the flange 416. In turn, the ball cover portion 150 covers the upwardly protruding parts of the hitch ball assembly 420, i.e. the hitch ball 422 and the ball base 424.

The secondary cover portion 110 of the present embodiment, as best shown in the exploded view of FIG. 4, is comprised of a first side portion 120 and a second side portion 130, which can be attached together, for example, by screws 140.

The ball cover portion 150 of the present embodiment includes a single movable cover 151 that is hinged through a hinge 152 to a mounting plate 154, which can be in turn attached on top of the secondary cover portion 110. Alternative embodiments are contemplated in which there is no mounting plate, and the movable cover 151 is directly and pivotably attached to any one of the parts forming the secondary cover portion 110, i.e. to the first side portion 120 or the second side portion 130. The movable cover 151 is longitudinally and rearwardly swivable around the hinge 152, about a transverse pivoting axis 153, and away from the hitch mount 410, between a closed position and an open position. In an alternative embodiment (not shown), the hinge 152 can be arranged on an opposite (front) side of the mounting plate 154 and the movable cover 151 can be pivotable longitudinally and frontwardly, i.e., towards the hitch mount 410. In further alternative embodiments (not shown), the movable cover 151 can be pivotable about a longitudinal axis, i.e., an axis in the direction of the elongated shank 412, so that the movable cover 151 is pivotable transversely or towards a side of the vehicle hitch 400, and in particular, towards a left or right side of the flange 416, providing minimal interference with a trailer hitched to the hitch ball 422 and arranged rearwardly to the flange 416. In the closed position, depicted in FIG. 1, the ball cover portion 150 covers the upwardly extending parts of the hitch ball assembly 420, including the hitch ball 422. In the open position, depicted in FIG. 3, the movable cover 151 has pivoted rearward (i.e., towards an imaginary trailer) for exposing the upwardly extending parts of the hitch ball assembly 420, including the hitch ball 422. In this open position, a trailer can be attached to the hitch ball 422 without having to remove the vehicle hitch cover 100. The movable cover 151 can further include a locking tab 156 which can be inserted into a corresponding locking tab receptacle 158 formed in the mounting plate 154 for locking the ball cover portion 150 in place when the ball cover portion 150 is in the closed position. Alternative embodiments are contemplated in which the locking tab is arranged in the mounting plate and the locking tab receptacle is arranged in the movable cover. Further alternative fasteners or fastening mechanisms are contemplated such as a snap fit, a frictional fit, a twist-lock fit, or the like.

The first side portion 120 of the present embodiment is essentially a solid body comprising a first inward-facing surface 121, a first inward-facing recess 122, a first top flange-seating surface 123, and a first top rim 124 protruding upwardly from the first top flange-seating surface 123, the first top rim 124 ending in a first top surface 125 generally parallel to the first top flange-seating surface 123. Likewise, the second side portion 130 of the present embodiment is essentially a solid body comprising a second inward-facing surface 131, a second inward-facing recess 132, a second top flange-seating surface 133, and a second top rim 134 protruding upwardly from the second top flange-seating surface 133, the second top rim 134 ending in a second top surface 135 generally parallel to the second top flange-seating surface 133. The first top rim 124 and the second top rim 134 together form a rim portion surrounding the flange 416 of the bracket 414 at an end of the shank 412 of the hitch mount 410 which is to be connected to a tow mount receiver of a vehicle. When assembled, as understood in FIG. 4, the first and second inward-facing surfaces 121, 131 meet and rest on each other, and the bottom protruding threaded rod 426 and nut 428 are housed in the first and second inward-facing recesses 122, 132; in turn, the flange 416 fits between the first and second top rims 124, 134, and a bottom surface of the flange 416 rests on the first and second top flange-seating surfaces 123, 133. The mounting plate 154, to which the movable cover 151 is hinged, is attached to the first and second top surfaces 125, 135 by screws 160.

When assembled, as shown in FIG. 1, the ball cover portion 150 and secondary cover portion 110 of the present embodiment imitate the shape of an outboard engine. The vehicle hitch cover 100 can further include a decorative propeller 170 to further resemble an outboard engine. One of the first side portion 120 and the second side portion 130 can include a bottom portion for receiving the decorative propeller 170. In the embodiment as shown, the bottom portion 126 is part of the first side portion 120. The decorative propeller 170 is rotatably attached to the bottom portion 126, so that it can spin like a pinwheel. For instance, the decorative propeller 170 of the present embodiment comprises a pin 172 that is rotatably inserted within a matching recess 128 of the bottom portion 126 of the first side portion 120.

In a fully opened position, the movable cover 151 can rest against the secondary cover portion 110 of the vehicle hitch cover 100, and can optionally be attached to the secondary cover portion 110 to prevent rattling.

Figure 6:
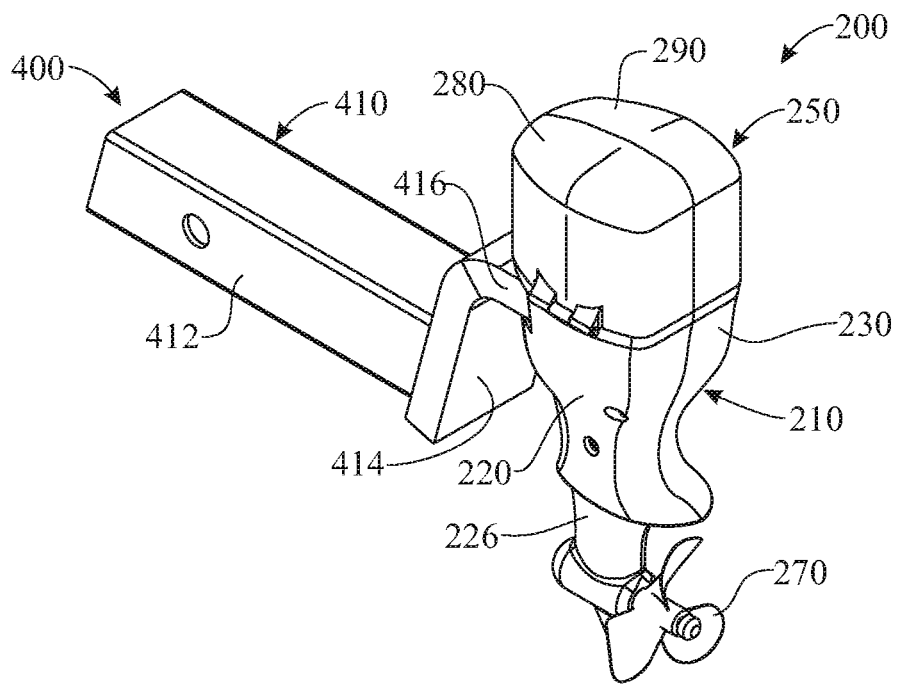
FIG. 6 presents an isometric rear view of an exemplary vehicle hitch provided with a second exemplary embodiment of a vehicle hitch cover, shown in a closed position.
Figure 7:
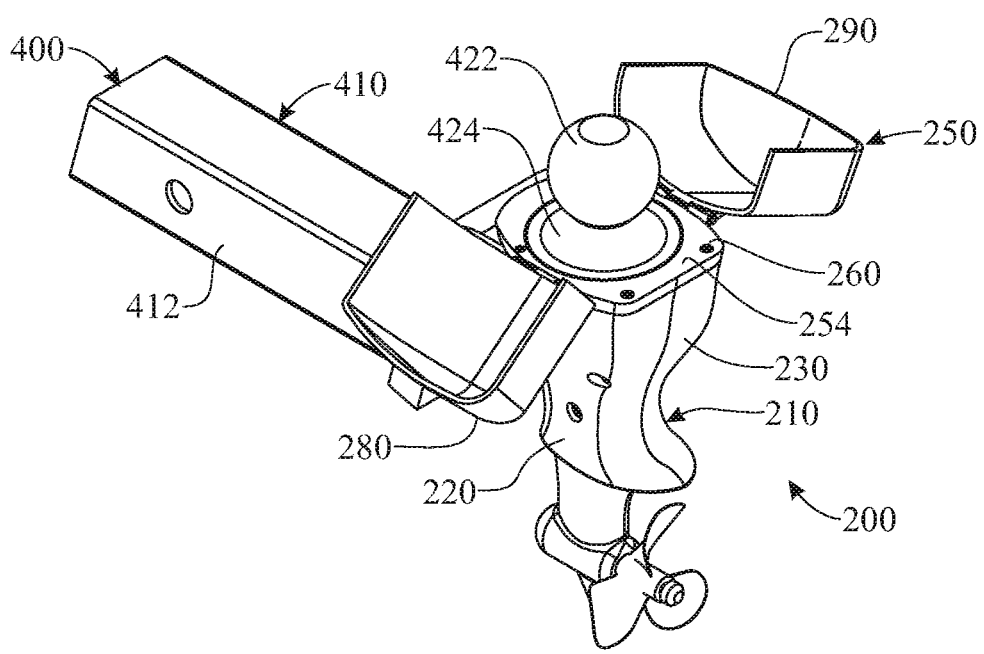
FIG. 7 presents an isometric rear view of the assembly of FIG. 6, the vehicle hitch cover being shown in a partially opened position.
Figure 8:
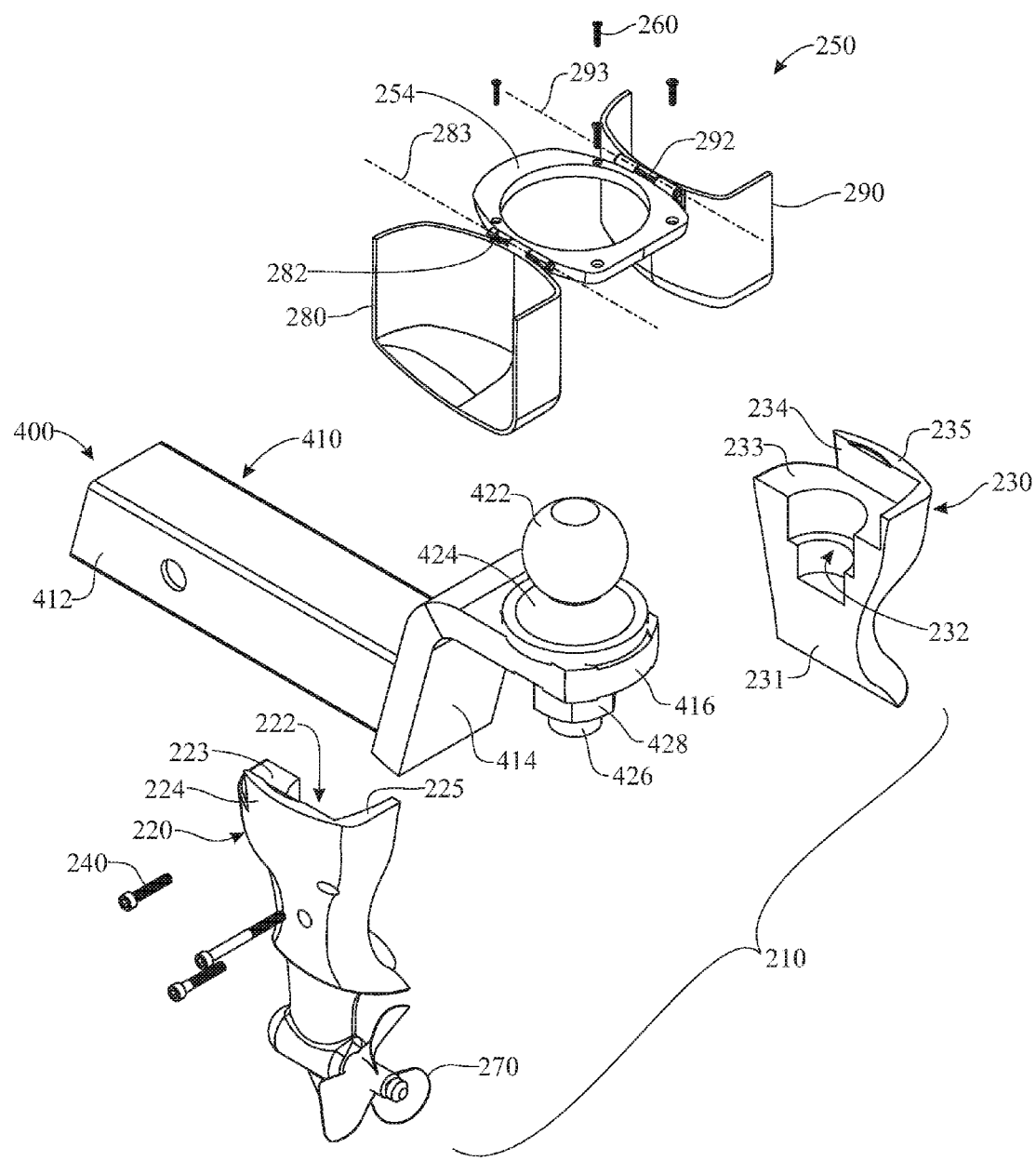
FIG. 8 presents an isometric exploded view of the assembly of FIG. 6, the vehicle hitch cover being shown in a fully opened position.

Referring now to FIGS. 6 through 8, a vehicle hitch cover 200 is illustrated in accordance with a second exemplary embodiment of the present invention. Like features of the vehicle hitch cover 200 and the vehicle hitch cover 100 (FIGS. 1 through 5) are numbered the same except preceded by the numeral '2'. As shown, the vehicle hitch cover 200 according to the second exemplary embodiment is substantially similar to the vehicle hitch cover 100 according to the first exemplary embodiment except that the vehicle hitch cover 200 of the second embodiment includes a ball cover portion 250 that is spit into a first movable cover 280 hinged to the mounting plate 254 through a first hinge 282 and a second movable cover 290 hinged to the mounting plate 254 through a second hinge 292. As shown in FIG. 8, the first movable cover 280 and the second movable cover 290 are transversely pivotable over the first and second hinges 282 and 292 and about respective longitudinal pivoting axes 283 and 293, respectively, to a closed position (FIG. 6) for covering the hitch ball 422 and opened positions (FIGS. 7 and 8) for exposing the hitch ball 422 of the vehicle hitch 400 so that a trailer can be attached to the hitch ball 422 without having to remove the vehicle hitch cover 200.

Similar to the first exemplary embodiment, the vehicle hitch cover 200 of the second exemplary embodiment includes a first side portion 220 and a second side portion 230, which can be attached together, for example, by screws 240 to form a secondary cover portion 210 for covering the flange 416 and the bottom protruding parts of the hitch ball assembly 420. The first side portion 220 has a first top rim 224 and the second side portion 230 has a second top rim 234. The first top rim 224 and the second top rim 234 together form a rim portion surrounding the flange 416 of the bracket 414 at an end of the shank 412 of the hitch mount 410, which is to be connected to a tow mount receiver of a vehicle. The first and second top rims 224, 234 have respective top surfaces 225, 235. The mounting plate 254, to which the first and second movable covers 280, 290 are hinged, can be attached to the top surfaces 225, 235 by screws 260.

The vehicle hitch cover 200 can further include a decorative propeller 270 and one of the first side portion 220 and the second side portion 230 can include a bottom portion for receiving the decorative propeller 270. In the embodiment as shown, the bottom portion 226 is part of the first side portion 220. The decorative propeller 270 is attached to the bottom portion 226 is a way that it can spin like a pinwheel.

In a fully opened position, the ball cover portion 250 can rest against the secondary cover portion 210 of the vehicle hitch cover 200, and can optionally be attached to the secondary cover portion 210 to prevent rattling.

In both exemplary embodiments as described above, the vehicle hitch cover according to the present invention has the advantage that the vehicle hitch cover can completely conceal a hitch ball so as to prevent the hitch ball from attracting dirt and getting rusty while the hitch ball is not in use, and the vehicle hitch cover can also provide access to the hitch ball for use by a trailer without having to be taken off. The switching between a fully closed position and a fully opened position can be achieved easily and quickly through the hinge or hinges.

Alternative embodiments are contemplated in which the ball cover portion is not pivotable relative to the secondary cover portion, but rather is removable from the secondary cover portion. By removable, it is understood that the ball cover portion cab be detached from the secondary cover portion and stored elsewhere when not in use.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A vehicle hitch and hitch cover combination, comprising:
    a vehicle hitch, comprising:
        a hitch mount for attaching to a vehicle, the hitch mount comprising a shank and a bracket extending from the shank, the bracket comprising a flange; and
        a hitch ball assembly mounted on the flange of the hitch mount, the hitch ball assembly comprising a hitch ball extending outwardly from the hitch mount; and
    a hitch cover, comprising:
        a ball cover portion comprising at least one movable cover that is movable relative to the hitch ball of the vehicle hitch, wherein the at least one movable cover is movable between a closed position for fully covering and concealing the hitch ball and an opened position for exposing the hitch ball; and
        a secondary cover portion removably attached to the vehicle hitch, the ball cover portion securable to the secondary cover portion, the secondary cover portion comprising a rim at least partially embracing the flange, wherein
        the ball cover portion is securable to an end surface of the rim.

2. The vehicle hitch and hitch cover combination of claim 1, wherein the hitch cover further comprises at least one fastener for securing the at least one movable cover in the closed position.

3. The vehicle hitch and hitch cover combination of claim 1, wherein the at least one movable cover is removably attached to the secondary cover portion.

4. The vehicle hitch and hitch cover combination of claim 1, wherein the at least one movable cover is pivotably movable relative to the hitch ball.

5. The vehicle hitch and hitch cover combination of claim 4, wherein the at least one movable cover consists of a single movable cover, which is pivotable about a transverse pivoting axis arranged perpendicular to a shank of the hitch mount.

6. The vehicle hitch and hitch cover combination of claim 4, wherein the at least one movable cover consists of two opposite side movable covers, which are pivotable about respective longitudinal pivoting axes arranged parallel to a shank of the hitch mount.

7. The vehicle hitch and hitch cover combination of claim 4, wherein the ball cover portion comprises a fixed mounting plate removably attachable to the secondary cover portion, and further wherein the at least one movable cover is pivotably connected to the mounting plate.

8. The vehicle hitch and hitch cover combination of claim 7, wherein one of the at least one movable cover and the mounting plate includes a locking tab configured to be received in a corresponding locking tab receptacle formed in the other of the at least one movable cover and the mounting plate to secure the at least one movable cover in the closed position.

9. The vehicle hitch and cover combination of claim 1, wherein the secondary cover portion is made of at least two separate parts removably attachable to one another.

10. The vehicle hitch and hitch cover combination of claim 1, wherein:
    the hitch ball assembly of the vehicle hitch further comprises a hitch ball assembly end portion extending outwardly from the hitch mount oppositely to the hitch ball; and wherein
    the secondary cover portion of the hitch cover is configured to cover the hitch ball assembly end portion when the secondary cover portion is attached to the vehicle hitch.

11. The vehicle hitch and hitch cover combination of claim 1, wherein the ball cover portion comprises a fixed mounting plate removably attachable to the rim of the secondary cover portion, and further wherein the at least one movable cover is pivotably connected to the mounting plate.

12. The vehicle hitch and hitch cover combination of claim 1, wherein the secondary cover portion comprises a seating surface for the seating thereon of a surface of the flange opposed to the hitch ball, and further wherein the rim extends from the seating surface.

13. The vehicle hitch and hitch cover combination of claim 12, wherein the secondary cover portion comprises a cavity for receiving the hitch ball assembly end portion, the cavity extending from the seating surface.

14. A vehicle hitch and hitch cover combination, comprising:
    a vehicle hitch, comprising a hitch mount for attaching to a vehicle and a hitch ball assembly affixed to the hitch mount, the hitch ball assembly comprising:
        a hitch ball extending outwardly from the hitch mount, and
        a hitch ball assembly end portion extending outwardly from the hitch mount oppositely to the hitch ball; and
    a hitch cover, comprising:
        a ball cover portion comprising at least one movable cover that is movable relative to the hitch ball, wherein the at least one movable cover is movable between a closed position for fully covering and concealing the hitch ball and an opened position for exposing the hitch ball; and
        a secondary cover portion removably attachable to the vehicle hitch, the secondary cover portion configured to cover the hitch ball assembly end portion when the secondary cover portion is attached to the vehicle hitch; wherein
        the ball cover portion is securable to the secondary cover portion.

15. A vehicle hitch cover for covering a hitch ball assembly, comprising:
    a ball cover portion comprising at least one movable cover; and
    a secondary cover portion, the secondary cover portion comprising a body having a flat seating surface, a cavity extending into the body from the seating surface, and a rim extending from the seating surface oppositely to the cavity and partially surrounding the cavity; wherein
    the ball cover portion is removably attachable to the secondary cover portion.

16. The vehicle hitch cover of claim 15, wherein the ball cover portion comprises a mounting plate removably attachable to the secondary cover portion, and further wherein the at least one movable cover is pivotably connected to the mounting plate.

17. The vehicle hitch cover of claim 16, wherein the mounting plate is removably attachable to an end surface of the rim of the body of the secondary cover portion.

18. A vehicle hitch and hitch cover combination, comprising:
   a vehicle hitch, comprising:
      a hitch mount for attaching to a vehicle; and
      a hitch ball assembly affixed to the hitch mount, the hitch ball assembly comprising a hitch ball extending outwardly from the hitch mount; and
   a hitch cover, comprising:
      a ball cover portion, comprising two opposite side movable covers which are pivotable relative to the hitch ball of the vehicle hitch about respective longitudinal pivoting axes arranged parallel to a shank of the hitch mount, wherein the two opposite side movable covers are movable between a closed position for fully covering and concealing the hitch ball and an opened position for exposing the hitch ball; and
      a secondary cover portion removably attached to the vehicle hitch, the ball cover portion securable to the secondary cover portion.

19. A vehicle hitch and hitch cover combination, comprising:
   a vehicle hitch, comprising:
      a hitch mount for attaching to a vehicle; and
      a hitch ball assembly affixed to the hitch mount, the hitch ball assembly comprising a hitch ball extending outwardly from the hitch mount; and
   a hitch cover, comprising:
      a ball cover portion comprising a fixed mounting plate and at least one movable cover that is pivotably connected to the fixed mounting plate and pivotably movable relative to the hitch ball of the vehicle hitch, wherein the at least one movable cover is movable between a closed position for fully covering and concealing the hitch ball and an opened position for exposing the hitch ball; and
      a secondary cover portion removably attached to the vehicle hitch, wherein the fixed mounting plate of the ball cover portion is removably attachable to the secondary cover portion; wherein
   one of the at least one movable cover and the mounting plate includes a locking tab configured to be received in a corresponding locking tab receptacle formed in the other of the at least one movable cover and the mounting plate to secure the at least one movable cover in the closed position.

* * * * *